US011034626B2

(12) United States Patent
Mutsaers et al.

(10) Patent No.: US 11,034,626 B2
(45) Date of Patent: Jun. 15, 2021

(54) FERTILIZER PARTICLE

(71) Applicant: YARA INTERNATIONAL ASA, Oslo (NO)

(72) Inventors: Petrus Cornelis Maria Mutsaers, Barkåker (NO); Terje Tande, Langesund (NO)

(73) Assignee: YARA INTERNATIONAL ASA, Oslo (NO)

( * ) Notice: Subject to any disclaimer, the term of this patent is extended or adjusted under 35 U.S.C. 154(b) by 127 days.

(21) Appl. No.: 16/462,643

(22) PCT Filed: Nov. 30, 2017

(86) PCT No.: PCT/EP2017/080985
§ 371 (c)(1),
(2) Date: May 21, 2019

(87) PCT Pub. No.: WO2018/100063
PCT Pub. Date: Jun. 7, 2018

(65) Prior Publication Data
US 2019/0276375 A1    Sep. 12, 2019

(30) Foreign Application Priority Data
Dec. 1, 2016 (EP) .................... 16201717

(51) Int. Cl.
C05G 5/30 (2020.01)
A01C 21/00 (2006.01)
C05B 7/00 (2006.01)
C05G 3/20 (2020.01)
C05C 1/00 (2006.01)
C05C 3/00 (2006.01)
C05B 19/00 (2006.01)

(52) U.S. Cl.
CPC .............. C05G 5/37 (2020.02); A01C 21/00 (2013.01); C05B 7/00 (2013.01); C05B 19/00 (2013.01); C05C 1/00 (2013.01); C05C 3/005 (2013.01); C05G 3/20 (2020.02); C05G 5/30 (2020.02)

(58) Field of Classification Search
None
See application file for complete search history.

(56) References Cited

U.S. PATENT DOCUMENTS

| 2,614,040 | A |   | 10/1952 | Kaikinger |   |
|---|---|---|---|---|---|
| 3,186,828 | A | * | 6/1965 | Baarson | B01J 2/30 71/11 |
| 3,234,003 | A |   | 2/1966 | Sawyer et al. |   |
| 3,234,006 | A | * | 2/1966 | Sawyer, Jr. | B01J 2/30 71/59 |
| 3,250,607 | A | * | 5/1966 | Sawyer, Jr. | C05G 5/30 71/64.07 |
| 3,580,715 | A |   | 5/1971 | Dilday |   |
| 4,150,965 | A |   | 4/1979 | Van Hijfte et al. |   |
| 4,185,988 | A | * | 1/1980 | Kistler | C05G 5/30 71/27 |
| 4,490,281 | A | * | 12/1984 | James | C05G 5/30 252/382 |
| 4,521,239 | A | * | 6/1985 | Simms | C05C 1/02 71/27 |
| 5,203,906 | A | * | 4/1993 | Schapira | C05G 3/20 71/64.12 |
| 6,475,259 | B1 |   | 11/2002 | Thomas et al. |   |
| 2005/0276905 | A1 | * | 12/2005 | Xing | C08G 18/36 427/2.1 |
| 2008/0098781 | A1 | * | 5/2008 | Lylykangas | C05C 1/00 71/11 |
| 2010/0031719 | A1 | * | 2/2010 | Hero | C05G 3/20 71/30 |
| 2010/0192653 | A1 | * | 8/2010 | Martinez | C05G 5/30 71/27 |
| 2012/0137930 | A1 | * | 6/2012 | Bijpost | C05G 3/20 106/504 |
| 2018/0110218 | A1 | * | 4/2018 | Mateo Herrero | C05G 3/60 |

FOREIGN PATENT DOCUMENTS

| AT | 311 394 | 11/1973 |
| EP | 0 039 972 | 11/1981 |
| EP | 2 578 557 | 4/2013 |
| GB | 1042797 | 9/1966 |
| GB | 2 116 159 | 9/1983 |
| RU | 2 370 498 | 10/2009 |
| WO | 01/30724 | 5/2001 |
| WO | 2006/010389 | 2/2006 |
| WO | 2014/128468 | 8/2014 |
| WO | 2014/181149 | 11/2014 |

OTHER PUBLICATIONS

International Search Report dated Feb. 20, 2018 in International (PCT) Application No. PCT/EP2017/080985.
Extended European Search Report dated Jun. 13, 2017 in corresponding European Application No. 16201717.2.

* cited by examiner

Primary Examiner — Wayne A Langel
(74) Attorney, Agent, or Firm — Wenderoth, Lind & Ponack, L.L.P.

(57) ABSTRACT

The present disclosure provides robust fertilizer particles suitable for fertigation. A composition comprising mineral oil, primary alkylamines and water-insoluble particles may coat fertilizer particles and make them suitable for fertigation. Furthermore, the coated particles display reduced dusting tendency. The coating composition may be applied as a thin, single, continuous layer covering the particle core. The coating may avoid surface film problems when the particles are dissolved in water, even if the very hydrophobic mineral oil is less dense than water. It may be counterintuitive to include water-insoluble particles in a fertilizer particle for fertigation, however the claimed particles may be dissolved to make a fertigation solution that avoid problems in tanks, nozzles and piping of the fertigation systems.

21 Claims, No Drawings

FERTILIZER PARTICLE

FIELD OF THE INVENTION

The present disclosure concerns fertilizer particles for fertigation.

BACKGROUND OF THE INVENTION

Fertigation is the well known process of the combined application of water and nutrients to a plant.

Plants require and use nutrients for growth. There are at least 16 nutrients considered as essential for plant growth and commonly classified as macronutrient and micronutrients relative to the requirement by plants. Primary nutrients are carbon (C), hydrogen (H), and oxygen (O), nitrogen (N), phosphorus (P) and potassium (K). Secondary macronutrients are calcium (Ca), magnesium (Mg), and sulfur (S). Additionally, the so called micronutrients, also commonly provided by mineral fertilizers are: boron (B), chlorine (Cl), copper (Cu), iron (Fe), manganese (Mn), zinc (Zn) and molybdenum (Mo).

Some of the primary nutrients are supplied from air and water: carbon (C), hydrogen (H), and oxygen (O). The rest of the primary nutrients may be supplied from the soil, however, when the soil supply is insufficient for optimal growth, they may be supplied by fertilizers. The primary fertilizer nutrients for plants are based on nitrogen (N), phosphorus (P) and potassium (K). The primary fertilizer nutrients are mainly absorbed by plants in the form of ions, such as $NO_3^-$, $NH_4^+$, $HPO_4^{2-}$, $H_2PO_4^-$ and $K^+$ Accordingly, most inorganic fertilizers provide salts comprising some or all of the mentioned ions.

The primary nutrient grade of fertilizers is often declared as X-Y-Z wherein the X value corresponds to a theoretical percentage of elemental nitrogen by weight in the fertilizer. Y is the phosphorous content corresponding to an imaginary weight fraction of $P_2O_5$. Z is the potassium content corresponding to an imaginary weight fraction of $K_2O$. According to this system, pure ammonium nitrate should be declared as 35-0-0 and pure potash (KCl) should be declared as 0-0-60.

Fertilizers providing all the primary fertilizer nutrients in an available form for the plants, are often referred to as NPK fertilizers. NPK particles are NPK fertilizers in solid form. Most NPK particles comprise significant levels of water-insoluble particles, often in the range of 5 to 20% w/w of the fertilizer particles. Accordingly, such particles are not suitable for fertigation which requires almost no presence of insoluble matters. Any presence of insoluble particles (fines) after dissolution can affect performance of fertigation systems by blocking or clogging the fertigation systems.

Melt granulation is the most commonly used industrial process for production of fertilizer particles. One type of melt granulation process involves heating of an aqueous mixture comprising fertilizer salts to generate a fertilizer melt. Another type of melt granulation processes involves reaction between mineral acids and ammonia to produce a heated reaction mixture comprising fertilizer salts. This reaction mixture is also a fertilizer melt that can be granulated by well-known techniques (e.g. GB2116159 and U.S. Pat. No. 2,614,040).

Fertilizer particles should be robust in order to maintain the physical integrity during manufacture, storage, transport and handling. Accordingly, it is often desired that fertilizer particles have low hygroscopicity, high particle strength, low caking tendency and low dusting tendency.

Absorption of moisture during storage and handling may reduce the physical quality of fertilizer particles. Most fertilizer particles are hygroscopic, but the hygroscopicity depends on several parameters including the chemical composition and the surface area. Generally, water absorption takes place if the water vapour pressure of the air exceeds the water vapour pressure of the fertilizer particle. Moisture absorption may lead to a number of problems including caking of particles during storage. One caking mechanism for inorganic NPK particles comprising ammonium nitrate is involving formation of crystal bridges between the particles.

Inorganic NPK particles can be coated for prevention of moisture uptake. Such coatings may disintegrate, become permeable or dissolve when applied to soil, depending on the coating composition. Some fertilizer coatings are designed to slowly release the nutrient content of the particle core. However, for fertigation, it is desired that any coated fertilizer particles dissolve rapidly and completely.

Some fertilizer coatings comprising waxes are known to reduce dust formation as disclosed in U.S. Pat. No. 6,475,259. However, fertilizer particles comprising wax- or polymer-containing coatings would likely cause surface film problems if dissolved in water.

On the other hand, U.S. Pat. No. 4,150,965 discloses a two-layer coating system allegedly improving properties during storage and transportation, wherein the individual fertilizer pellets are provided throughout their entire surface with a uniform and substantially continuous coating of alkylamine in the solid state and with a layer of mineral oil applied over said coating. The alkylamine coating can constitute 0.02 to 0.05% w/w of the particle and the mineral oil coating can constitute 0.03 to 0.15 w/w of the particle.

Thus there is a need for highly water-soluble robust fertilizer particles with single layer coatings suitable for fertigation.

SUMMARY

The present disclosure provides robust fertilizer particles suitable for fertigation. A composition comprising mineral oil, primary alkylamines and water-insoluble particles may coat fertilizer particles and make them suitable for fertigation. Furthermore, the coated particles display reduced dusting tendency. The coating composition may be applied as a thin, single, continuous coating covering the particle core. The coating may avoid surface film problems when the coated particles are dissolved in water, even if the very hydrophobic mineral oil is less dense than water. It may be counterintuitive to include water-insoluble particles in a fertilizer particle for fertigation, however the claimed particles may be dissolved to make a fertigation solution that avoid problems in tanks, nozzles and piping of the fertigation systems.

In a first embodiment, it is provided a fertilizer particle for fertigation comprising a core and a continuous coating wherein the core comprises inorganic nutrient salts and wherein the continuous coating comprises 97 to 99% w/w of a mineral oil and 1 to 3% w/w primary alkylamines and represents 0.05 to 0.25% w/w of the particle. In one aspect of the first embodiment, the fertilizer particle is a NPK particle or a NP particle.

In a second aspect of the first embodiment, the core comprises the reaction product of at least one mineral acid selected from nitric acid, phosphoric acid, sulfuric acid and mixtures of these; and ammonia.

In a third aspect of the first embodiment, the core consists of the reaction product of at least one mineral acid selected from nitric acid, phosphoric acid, sulfuric acid and mixtures of these; and ammonia.

In a fourth aspect of the first embodiment, the core comprises less than 1.0% w/w of water-insoluble material.

In a fifth aspect of the first embodiment, the core comprises less than 0.7% w/w of water-insoluble material.

In a sixth aspect of the first embodiment, the core has a roughly spherical shape.

In a seventh aspect of the first embodiment, the continuous coating represents 0.05 to 0.2% w/w of the particle.

In an eighth aspect of the first embodiment, the diameter of the core is in the range of 2 to 4 mm.

In a ninth aspect of the first embodiment, the coating comprises 0.1 to 1.0% w/w of water-insoluble particles.

In a tenth aspect of the first embodiment, the coating comprises 0.1 to 0.5% w/w talcum particles with an average particle size(d50) in the range of 10 to 30 μm.

In a eleventh aspect of the first embodiment, the mineral oil comprises a hydrotreated heavy naphthenic petroleum fraction.

In a twelfth aspect of the first embodiment, the primary alkylamines are hydrogenated tallow amines.

In a second embodiment, it is provided a method for producing a fertilizer particle for fertigation comprising the steps
a. reacting at least one mineral acid selected from nitric acid, phosphoric acid, sulfuric acid and mixtures of these; with ammonia to form a heated aqueous reaction mixture
b. particulating the heated aqueous reaction mixture
c. coating the particles from step b. with a coating composition comprising 97 to 99% w/w of a mineral oil and 1 to 3% w/w primary alkylamines In one aspect of the second embodiment, water is evaporated from the heated aqueous reaction mixture to a level below 2% w/w before the particulation step.

In a second aspect of the second embodiment, the viscosity of the mineral oil is in the range of 90 to 130 centistokes at 40° C.

In a third aspect of the second embodiment, the particulation is a prilling, agitation, or spherodizing process.

In a fourth aspect of the second embodiment, the coating composition comprises 0.1 to 0.5% w/w of water-insoluble particles.

In a third embodiment, it is provided a product obtained by the process of the second embodiment.

In a fourth embodiment, it is provided a use of the particles according to the first embodiment for fertigation.

DETAILED DESCRIPTION

It is found that a specific coating composition comprising mineral oil, primary alkylamines may be used to coat fertilizer particles. Such coated fertilizer particles display low dusting tendency and are suitable for fertigation.

Fertigation is a method for providing an aqueous solution comprising dissolved fertilizer nutrients to plants. Accordingly, the need for fertilizer nutrients and water can be simultaneously fulfilled. As used herein, the fertigation solution is the aqueous fertilizer solution to be applied on the field. It can be made by dissolving fertilizer particles suitable for fertigation in water. The fertigation solution may be commercially provided as is, but due to high transportation cost, it is convenient that the fertigation solution is made locally at the farms. Thus, there is a need for fertilizer particles suitable for fertigation. As used herein, fertilizer particles suitable for fertigation, means highly water-soluble, robust fertilizer particles comprising a coating that may avoid severe surface film generation on the fertigation solution and/or in the fertigation equipment like tanks, nozzles, water emissors and piping. In particular, the fertigation solution should be able to be emitted by pivots, macro- and micro-sprinklers.

One benefit of fertigation can be greater flexibility and control of applied nutrients than conventional spreading of solid fertilizer particles. Furthermore, the nutrients may be applied when needed and in small doses, which reduces the potential for nutrient leach into surroundings. A drawback of fertigation can be clogging of nozzles and piping due to insoluble material in the fertigation solution. The water-insoluble material may be present in the fertilizer particle or result from reactions between the fertilizer components and impurities and/or contaminants in the water. Examples of such water-insoluble material include calcium phosphate, calcium silicates and talcum. Accordingly, for fertigation solutions comprising phosphate, the level of calcium ions in the fertigation solution should be as low as possible to avoid formation of insoluble calcium phosphate particulates.

A variety of fertilizer particles comprising inorganic nutrient salts, i.e. fertilizer salts, are known. As used herein, inorganic nutrient salts, are non-toxic water-soluble salts comprising at least one of the ions $NO_3^-$, $NH_4^+$, $HPO_4^{2-}$, $H_2PO_4^-$ and $Kt^+$ Most inorganic fertilizers comprise water-soluble salts providing some or all these ions in an available form to the plants. By water-soluble salts we mean salts that have a solubility in water at 25° C. above 1 g per liter.

As used herein, NPK fertilizers means fertilizers comprising all the three primary fertilizer nutrients in the form of water-soluble inorganic nutrient salts. As used herein, NP fertilizers means fertilizers comprising a nitrogen source and a phosphorous source in the form of water-soluble inorganic nutrient salts. Accordingly, both NPK fertilizers and NP fertilizers comprise phosphate. A NPK particle is a NPK fertilizer in solid form. A NP particle is a NP fertilizer in solid form.

Inorganic fertilizers particles providing some or all the primary fertilizer nutrients in an available form for the plants are often produced by granulation of a fertilizer melt. As used herein, a fertilizer melt is any fluid comprising completely and/or partly dissolved fertilizer salts wherein the water content is less than 20% w/w. Accordingly, the fertilizer melt may be solid at ambient temperature, but liquid at increased temperatures such as above 100° C. Excess water is often evaporated from the fertilizer melt before a drop generation step. The drop generation step can involve spraying of the fertilizer melt through nozzles. The liquid drops can then be solidified by various well known methods. Prilling is one type of melt granulation process which can produce reasonably uniform spherical particles by solidifying the drops as they fall through a cooling fluid. Pan granulation is one type of melt granulation process which solidifies drops by agitation and layering. Such melt granulation processes can be used to form roughly spherical particles. For a roughly spherical particle, all smallest diameters of all cross sections are similar. For a roughly spherical particle, all largest diameters of all cross sections are all similar. Furthermore, for a roughly spherical particle, the largest diameter is in the range of 100 to 120% of the smallest diameter of the particle.

When aqueous solutions of mineral acids are reacted with anhydrous or aqueous ammonia, a heated aqueous reaction mixture comprising fertilizer salts can be made. This reaction mixture may form a fertilizer melt that may be granulated by well-known techniques. Depending on the purity of the raw materials, such fertilizer melts may have very low levels of water-insoluble material. Without wishing to be bound by theory, we expect that if pure mineral acids are reacted with pure ammonia, essentially all the generated salts will be water-soluble. Mineral acids include hydrochloric acid, nitric acid, phosphoric acid and sulfuric acid. However, for fertilizer use, hydrochloric acid is often avoided. As used herein, the suitable mineral acids are selected from nitric acid, phosphoric acid, sulfuric acid and any mixtures of any of these. As used herein, the mineral acids include the aqueous solutions obtained when dissolving the mineral acids in water. It follows that the fertilizer particles obtained from such fertilizer melts can also be expected to be highly water-soluble, i.e. contain very low levels of water-insoluble material. In particular the fertilizer particles obtained from such fertilizer melts may comprise less than 1% w/w water-insoluble material. In particular the fertilizer particles obtained from such fertilizer melts may comprise less than 0.7% w/w water-insoluble material. In particular the fertilizer particles obtained from such fertilizer melts may comprise less than 0.5% w/w water-insoluble material. In particular the fertilizer particles obtained from such fertilizer melts may comprise 0.1 to 1% w/w water-insoluble material or more particularly 0.1 to 0.7% w/w or 0.1 to 0.5% w/w water-insoluble material. Such fertilizer particles may be coated in order to maintain the physical integrity during manufacture, storage, transport and handling.

Divalent cations present in any of the ingredients used for melt granulation processes may generate water-insoluble salts. In particular, the calcium phosphate salt $CaHPO_4$ may be generated if solutions comprising calcium ions are mixed with solutions comprising phosphate. Other water-insoluble salts may also be formed from ferrous, ferric or magnesium ions. As used herein, water-insoluble salts, are salts with a solubility in water at 25° C. below 1 g per liter.

For fertigation particles, it is generally desired to provide a coating composition that is able to protect the core by a single, continuous and thin layer. As used herein, a continuous coating will cover the core surface sufficiently for avoiding caking problems. In particular, the continuous coating may cover more than 90% of the core surface. In particular, the continuous coating may cover more than 95% of the core surface. In particular, the continuous coating may cover more than 98% of the core surface. In particular, the continuous coating may cover more than 99% of the core surface. In particular, the continuous coating may cover the core completely. The thickness of a layer can be defined by the amount of a continuous coating applied as a weight percentage compared to the weight of the particle. Appropriate amounts of coating to be applied to particles is discussed in more detail below to produce suitably "thin" layer. Without being bound by theory, layers that are too thick may lead to clogging of nozzles and piping due to insoluble material in the coating.

It is found that a coating composition comprising 97 to 99% w/w of a mineral oil was beneficial; in particular, the examples demonstrate a coating composition comprising a hydrotreated heavy naphthenic petroleum fraction. In particular, the examples demonstrate a coating composition comprising 98% w/w of a hydrotreated heavy naphthenic petroleum fraction.

Mineral oils can be refined from petroleum crude oils or made synthetically. As used herein, mineral oil means a mixture which is liquid at room temperature has a boiling point in the range of 300 to 600° C. and comprises predominantly C15 to C50 linear hydrocarbons, branched hydrocarbons and/or aromatic hydrocarbons. When mineral oils are used in fertilizer coatings, it can be expected that any small fraction of volatile components evaporate over time. Accordingly, the chemical composition of the mineral oil may gradually change over time without major effects on its suitability.

Hydrotreating a mineral oil may include saturation of bonds, desulfurization and removal of impurities. Accordingly, "hydrotreated heavy naphthenic petroleum fraction" is a mineral oil which can be obtained by distillation of petroleum to obtain a fraction which is subsequently hydrotreated. After hydrotreating, the fraction predominantly consists of C20 to C50 saturated cycloalkanes in the form of an oil with a kinematic viscosity of at least 19 centistokes at 40° C. Accordingly, "hydrotreated paraffinic petroleum fraction" is a mineral oil which can be obtained by distillation of petroleum to obtain a fraction which is subsequently hydrotreated. After hydrotreating, the fraction predominantly consists of C20 to C50 saturated linear or branched alkanes.

The viscosity of mineral oils depend on their composition, and it is found that dusting levels correlated with the viscosity of the mineral oil. The viscosity of the mineral oils used in the coating may be in the range of 20 to 140 centistokes at 40° C. More particularly, the viscosity may be in the range of 30 to 130 centistokes at 40° C. More particularly, the viscosity may be in the range of 90 to 130 centistokes at 40° C. Viscosities referred to throughout this document are kinematic viscosities.

As mineral oils are hydrophobic and less dense than water, they can be expected to float. Accordingly, it is beneficial to have the thickness of the coating as small as possible for a fertigation particle. It has been found that the present coating composition is able to protect the core with a thin, single, continuous layer completely covering the core. As used herein a thin, single, continuous layer can cover fertilizer particles when the coating composition is applied in the range of 0.05 to 0.25% w/w of the particle. More particularly, the coating composition is applied in the range of 0.05 to 0.20% w/w and even more particularly within the range of 0.05 to 0.15% w/w of the particle. It is noted that melt granulation may be used to generate such roughly spherical particle cores and that the surface area to volume is minimized, thus also minimizing the amount of coating composition needed to cover the core. NPK particles of different sizes or shapes may require more or less of the coating composition to cover the core and the amount needed can easily be determined by a person skilled in the art. More particularly, the diameter of the core particle is between 2 and 4 mm.

It has also been found that the coating composition disclosed herein may avoid major surface film problems when the coated particles are dissolved in water. In contrast, fertilizer particles with wax-containing coatings would be expected to cause problems on the surface of the fertigation solution or in the fertigation nozzles. Without wishing to be bound by theory, the mineral oil may cause particulates originating from the coating composition to more easily pass the fertigation nozzles. Nonetheless, the coating composition applied in the range 0.05 to 0.25% w/w of the particle, as disclosed in the previous paragraph was found to be suitable for use of the coated particle in fertigation applications.

The coating composition provided also comprises a minor amount of primary alkylamines. Without wishing to be bound by theory, it is speculated that these compounds may prevent the formation of strong crystal bridges between the particles. The primary alkylamines may be single compounds or mixtures of such compounds having a melting point above ambient temperature. In particular, the primary alkylamines may be linear C12 to C20 compounds with a terminal amine. In particular, the primary alkylamines may be linear C14 to C18 compounds with a terminal amine. In particular, the primary alkylamines may be linear C16 to C18 compounds with a terminal amine. Numerous mixtures of suitable primary alkylamines are available, for example Armeen HT from AkzoNobel Surface Chemistry and hydrogenated tallow amine from a variety of suppliers.

The coating composition provided may also comprise a minor amount of water-insoluble particles. It may seem counterintuitive to add water-insoluble particles to a fertilizer for fertigation, however, this has been found to improve the handling properties of the fertilizer without adversely affecting fertigation itself. Numerous such water-insoluble particles are known in the field of fertilizers, e.g. talcum, clays, dolomite, calcium silicates. As used herein, water-insoluble particles, are solid particles with a solubility in water at 25° C. below 1 g per liter. Such particles can be applied to a coating as a powder. Without wishing to be bound by theory, these particles may prevent tight contact between the fertilizer particles and thus reduce the caking tendency. The water-insoluble particles may be added to the fertilizer particles before the coating step or after the coating step. The water-insoluble particles may, for example, have an volume based average particle size (d50) in the range of 10 to 30 μm (as measured by conventional laser diffraction methods). They may also have an average particle size (d50) in the range of 15 to 25 μm. They may also have an average particle size (d50) in the range of 18 to 23 μm. When the coating composition comprises such water-insoluble particles, caking may be reduced while the particles may avoid sedimentation in the fertigation equipment. Without wishing to be bound by theory, the particles may remain in contact with the hydrophobic coating components in the fertigation solution. In particular, the coating composition may comprise 0.1 to 0.5% w/w water-insoluble particles. In particular, the coating composition may comprise 0.2 to 0.4% w/w water-insoluble particles. In particular, the coating composition may comprise about 0.3% w/w water-insoluble particles. In particular, the coating composition may comprise 0.1 to 0.5% w/w talcum particles with an average size in the range of 10 to 30 μm. In particular, the coating composition may comprise 0.2 to 0.4% w/w talcum particles with an average particle size in the range of 10 to 30 μm. In particular, the coating composition may comprise about 0.3% w/w talcum particles with an average particle size in the range of about 20 μm.

"About X" as used herein, means any measured value that would be rounded to X.

The present invention is defined by the claims and not by the following examples:

EXAMPLES

Example 1

Aqueous nitric acid (60-65% w/w), aqueous phosphoric acid (fertilizer grade, 52% w/w) and sulfuric acid (98% w/w) was reacted with anhydrous ammonia (100% w/w) to form a reaction mixture comprising 15% w/w water under atmospheric pressure. The reaction mixture was added to a granulator to provide highly water-soluble NPK particles (13-4-25). These particles may be coated to obtain fertilizer particles for fertigation.

Example 2

Impact of coating compositions on NPK particles (14-7-18):

TABLE 1

| Sample | Coating composition | Coating amount w/w of particle | Water absorbed % of granule weight | Crushing strength (kgf) 24 hours after 1% w/w water added | Caking (gf) at 25° C./ 60% relative humidity | Dusting mg/kg |
|---|---|---|---|---|---|---|
| 1 | Wax, oil, amines, talcum | 0.18% | 1.88 | 7.3 | 777 | 2387 |
| 2A | 92% w/w hydrotreated heavy naphthenic petroleum fraction (viscosity 31 centistokes), 8% w/w hydrogenated tallow amine and 0.3% w/w talcum | 0.08% | 1.83 | 6.7 | 744 | 3041 |
| 2B | 92% w/w hydrotreated heavy naphthenic petroleum fraction (viscosity 110 centistokes), 8% w/w hydrogenated tallow amine and 0.3% w/w talcum | 0.08% | 1.84 | 7.3 | 846 | 3127 |
| 3A | 92% w/w hydrotreated heavy naphthenic petroleum fraction (viscosity 31 centistokes), 8% w/w hydrogenated tallow amine and 0.4% w/w talcum | 0.08% | 1.84 | 7.2 | 775 | 3806 |
| 3B | 92% w/w hydrotreated heavy naphthenic petroleum fraction | 0.08% | 1.93 | 7.4 | 610 | 3298 |

TABLE 1-continued

| Sample | Coating composition | Coating amount w/w of particle | Water absorbed % of granule weight | Crushing strength (kgf) 24 hours after 1% w/w water added | Caking (gf) at 25° C./ 60% relative humidity | Dusting mg/kg |
|---|---|---|---|---|---|---|
| | (viscosity 110 centistokes), 8% w/w hydrogenated tallow amine and 0.4% w/w talcum | | | | | |
| 4A | 98% w/w hydrotreated heavy naphthenic petroleum fraction (viscosity 31 centistokes), 2% w/w hydrogenated tallow amine and 0.3% w/w talcum | 0.08% | 1.88 | 7.3 | 748 | 2318 |
| 4B | 98% w/w hydrotreated heavy naphthenic petroleum fraction (viscosity 110 centistokes), 2% w/w hydrogenated tallow amine and 0.3% w/w talcum | 0.08% | 1.88 | 7.4 | 834 | 2082 |
| 5 | None | — | 1.77 | 7.4 | 2617 | 4315 |

In sample 1, NPK particles, 14-7-18, were coated with 0.18% w/w of a composition comprising waxes, oil, amines and talcum. The robustness, including hygroscopicity, particle strength, caking tendency and dusting level, were then tested by conventional methods.

In sample 2A, NPK particles, 14-7-18, were coated with 0.08% w/w of a composition comprising 92% w/w hydrotreated heavy naphthenic petroleum fraction (viscosity 31 centistokes at 40° C.), 8% w/w hydrogenated tallow amine and 0.3% w/w talcum. The robustness, including hygroscopicity, particle strength, caking tendency and dusting level, were then tested by conventional methods.

In sample 2B, NPK particles, 14-7-18, were coated with 0.08% w/w of a composition comprising 92% w/w hydrotreated heavy naphthenic petroleum fraction (viscosity 110 centistokes at 40° C.), 8% w/w hydrogenated tallow amine and 0.3% w/w talcum. The robustness, including hygroscopicity, particle strength, caking tendency and dusting level, were then tested by conventional methods.

In sample 3A, NPK particles, 14-7-18, were coated with 0.08% w/w of a composition comprising 92% w/w hydrotreated heavy naphthenic petroleum fraction (viscosity 31 centistokes at 40° C.), 8% w/w hydrogenated tallow amine and 0.4% w/w talcum. The robustness, including hygroscopicity, particle strength, caking tendency and dusting level, were then tested by conventional methods.

In sample 3B, NPK particles, 14-7-18, were coated with 0.08% w/w of a composition comprising 92% w/w hydrotreated heavy naphthenic petroleum fraction (viscosity 110 centistokes at 40° C.), 8% w/w hydrogenated tallow amine and 0.4% w/w talcum. The robustness, including hygroscopicity, particle strength, caking tendency and dusting level, were then tested by conventional methods.

In sample 4A, NPK particles, 14-7-18, were coated with 0.08% w/w of a composition comprising 98% w/w hydrotreated heavy naphthenic petroleum fraction (viscosity 31 centistokes at 40° C.), 2% w/w hydrogenated tallow amine and 0.3% w/w talcum. The robustness, including hygroscopicity, particle strength, caking tendency and dusting level, were then tested by conventional methods.

In sample 4B, NPK particles, 14-7-18, were coated with 0.08% w/w of a composition comprising 98% w/w hydrotreated heavy naphthenic petroleum fraction (viscosity 110 centistokes at 40° C.), 2% w/w hydrogenated tallow amine and 0.3% w/w talcum. The robustness, including hygroscopicity, particle strength, caking tendency and dusting level, were then tested by conventional methods.

In sample 5, uncoated NPK particles (14-7-18) were tested as sample 1 to 4B.

As apparent from the results, non-coated NPK particles (sample 5) and NPK particles comprising a wax-containing coating (sample 1) are used as reference. By using a different coating without wax, comprising 92% w/w mineral oil and 8% w/w primary alkylamines, the hygroscopicity, particle strength and caking tendency was not significantly affected. However, dusting problems arose (sample 2A, 2B, 3A and 3B). By changing the coating composition to 98% w/w mineral oil and 2% w/w amines (sample 4A and 4B), the dusting tendency was similar to the particles coated with the wax-containing coating. The best dusting values was achieved with sample 4B which contained a mineral oil with a viscosity of 110 centistokes at 40° C.

Example 3

Fertilizer particles (13-4-25) were coated to achieve a continuous coating comprising 98% w/w of a hydrotreated heavy naphthenic petroleum fraction (viscosity 110 centistokes at 40° C.), 2% w/w hydrogenated tallow amine and 0.3% w/w talcum particles. Samples of the coated fertilizer particles were dissolved in water at 21° C. and stirred 1 hour to make fertigation solutions comprising 5, 10, 15% w/w of the fertilizer. Subsequently, the fertigation solutions were filtered through a 3 μm filter, the glasses were washed with small amounts of isopropanol and the insoluble fractions were collected and weighed after drying. The drying was done in an oven for 30 minutes at 105° C. As can be seen from table 2, fertigation solutions comprising 5 or 10% w/w of the dissolved fertigation particles contained less than 1.0% w/w of insoluble matter caught by the 3 μm filter.

TABLE 2

| Fertigation solution made by dissolving the fertilizer particles from example 3 | Insoluble matter collected on filter relative to the weight of the fertilizer particles |
|---|---|
| 0% w/w (control) | 0% w/w |
| 5% w/w solution | 0.8% w/w |
| 10% w/w solution | 0.9% w/w |
| 15% w/w solution | 1.7% w/w |

The invention claimed is:

1. A fertilizer particle for fertigation, said particle comprising a core and a continuous coating, wherein
the core comprises inorganic nutrient salts, and
the continuous coating is a single layer and comprises 97 to 99% w/w of a mineral oil, 1 to 3% w/w primary alkylamines, and 0.1 to 1.0% w/w of water-insoluble particles, and represents 0.05 to 0.25% w/w of the particle.

2. The particle according to claim 1, wherein the fertilizer particle is a NPK particle or a NP particle.

3. The particle according to claim 1, wherein the core comprises a reaction product of at least one mineral acid selected from the group consisting of nitric acid, phosphoric acid, sulfuric acid, and mixtures thereof; and ammonia.

4. The particle according to claim 1, wherein the core consists of a reaction product of at least one mineral acid selected from the group consisting of nitric acid, phosphoric acid, sulfuric acid, and mixtures thereof; and ammonia.

5. The particle according to claim 1, wherein the core comprises less than 1.0% w/w of water-insoluble material.

6. The particle according to claim 1, wherein the core comprises less than 0.7% w/w of water-insoluble material.

7. The particle according to claim 1, wherein the core has a roughly spherical shape.

8. The particle according to claim 1, wherein the continuous coating comprises 97 to 99% w/w of a mineral oil, and represents 0.05 to 0.20% of the weight of the particle.

9. The particle according to claim 1, wherein the average diameter of the core is in the range of 2 to 4 mm.

10. The particle according to claim 1, wherein the coating comprises 0.1 to 0.5% w/w of water-insoluble particles.

11. The particle according to claim 1, wherein the coating comprises 0.1 to 0.5% w/w of talcum particles with an average particle size (d50) in the range of 10 to 30 μm.

12. The particle according to claim 1, wherein the mineral oil comprises a hydrotreated heavy naphthenic petroleum fraction.

13. The particle according to claim 1, wherein the primary alkylamines are hydrogenated tallow amines.

14. A method of fertigation, comprising the steps of:
(a) dissolving fertilizer particles according to claim 1 in water to form a solution, and
(b) distributing the solution from (a) to a plant.

15. A method for producing a fertilizer particle for fertigation, said method comprising the following steps:
a) reacting at least one mineral acid selected from the group consisting of nitric acid, phosphoric acid, sulfuric acid and mixtures thereof; with ammonia to form a heated aqueous reaction mixture,
b) particulating the heated aqueous reaction mixture,
coating the particles from step b) with a single layer of a coating composition comprising 97 to 99% w/w of a mineral oil, 1 to 3% w/w primary alkylamines and 0.1 to 1.0% w/w of water-insoluble particles, such that the coating composition represents 0.05 to 0.25% w/w of the particles.

16. The method according to claim 15, wherein water is evaporated from the heated aqueous reaction mixture to a level below 2% w/w before the particulation step.

17. The method according to claim 15, wherein the viscosity of the mineral oil is in the range of 90 to 130 centistokes at 40° C.

18. The method according to claim 15, wherein the particulation is a prilling, agitation, or spherodizing process.

19. The method according to claim 15, wherein the coating composition comprises 0.1 to 0.5% w/w of water-insoluble particles.

20. The method according to claim 15, wherein the coating composition represents 0.05 to 0.2% w/w of the particles.

21. A fertilizer particle obtained by the process according to claim 15.

* * * * *